(12) United States Patent
Dakhil (10) Patent No.: US 6,748,505 B1
(45) Date of Patent: Jun. 8, 2004

(54) EFFICIENT SYSTEM BUS ARCHITECTURE FOR MEMORY AND REGISTER TRANSFERS

(75) Inventor: Dani Y. Dakhil, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 328 days.

(21) Appl. No.: 09/613,791

(22) Filed: Jul. 11, 2000

(51) Int. Cl.$^7$ ................................................ G06F 12/00
(52) U.S. Cl. ..................... 711/167; 711/168; 711/154; 711/157; 710/112; 710/107
(58) Field of Search ................................ 711/167, 168, 711/154, 157; 710/112, 107

(56) References Cited

U.S. PATENT DOCUMENTS

| | | | | |
|---|---|---|---|---|
| 5,006,982 A | * | 4/1991 | Ebersole et al. | ............ 710/263 |
| 6,049,847 A | * | 4/2000 | Vogt et al. | .................. 710/309 |
| 6,182,176 B1 | * | 1/2001 | Ziegler et al. | .............. 710/112 |
| 6,442,631 B1 | * | 8/2002 | Neufeld et al. | ............. 710/107 |

* cited by examiner

Primary Examiner—Matthew Kim
Assistant Examiner—Stephen Elmore
(74) Attorney, Agent, or Firm—Michael A. Proksch (57) ABSTRACT

A method of efficiently performing transactions on the system bus which includes at least a request signal line, a grant signal line, a set of address signal lines, and a set of data signal lines in which upon the falling edge of the grant signal from the memory controller for a first memory transaction and prior to the completion of the servicing of the first memory transaction, a second memory transaction can be issued. Once a first address corresponding to the first memory transaction request is transmitted to the memory controller, the address lines are available for transmitting a second address corresponding to the second memory transaction request to the memory controller. The memory controller then stores the second address in a buffer whereupon the completion of servicing the first memory transaction request, the second request can be serviced without waiting for the second request arbitration process or for the address to be transmitted to the memory controller. In addition, in another aspect of the method for efficiently utilizing the system bus, register transactions between system sub-blocks and the system's central processing unit are performed using the system bus by multiplexing register data onto the address signal lines of the system bus when the address signal lines are idle, thereby further minimizing address line idle cycles.

101 Claims, 6 Drawing Sheets

| Signal Name | Direction | Description |
|---|---|---|
| rrRTReq[1:0] | P2P (Point-To-Point) | Request lines for a register transaction<br>rrRTReq[0]: ARC CPU<br>rrRTReq[1]: PCI Module |
| rrRTGnt[1:0] | P2P | Grant lines for a register transaction<br>rrRTGnt[0]: ARC CPU<br>rrRTGnt[1]: PCI Module |
| rrRTStart | Tri-State | Driven by master module during register transaction to qualify the address on rrAD. |
| rrRTEnd | Tri-State | Driven by target module during register transaction to mark end of transaction (target module sank data from rrAD or sourced data on rrAD). |
| rrRTSize[1:0] | Tri-State | Access size driven by the master during the address cycle. |
| rrMTReq[5:0] | P2P | Request lines for a memory transaction<br>rrMTReq[0]: ARC CPU<br>rrMTReq[1]: PCI Module<br>rrMTReq[2]: Fabric<br>rrMTReq[3]: Config buffer<br>rrMTReq[5:4]: Unused |
| rrMTGnt[5:0] | P2P | Grant lines for a memory transaction<br>rrMTGnt[0]: ARC CPU<br>rrMTGnt[1]: PCI Module<br>rrMTGnt[2]: Fabric<br>rrMTGnt[3]: Configuration buffer<br>rrMTGnt[5:4]: Unused |
| rrRW | Tri-State | 1: Register/Memory read transaction. 0: Register/Memory write transaction |
| rrData[127:0]<br>rrAD[31:0]<br>rrSize[7:0] | Tri-State<br>Tri-State<br>Tri-State | Memory Data Bus<br>Address/Data Bus<br>Transfer Size in 32-bit words |

EFFICIENT SYSTEM BUS ARCHITECTURE FOR MEMORY AND REGISTER TRANSFERS

BACKGROUND OF THE INVENTION

1. Field of The Invention

The present invention relates to a system bus used to perform data transactions within a processing system, and particularly to a system bus architecture used to perform memory and register transactions in a processing system.

2. State of The Art

A system bus in a processing or computing system is typically a shared communication link which uses one set of wires to communicate control, address, and data information between multiple sub-blocks within the processing system. The system bus uses a dedicated set of wires to perform the system communications, and often times different wires in the set are used to transmit different information. For instance, in some system buses, the same group of wires is used to transmit both data and addresses information. In this case, the data and address information is multiplexed onto the same system bus wires. In other system buses, data and address information is transmitted on physically separate groups of wires. In addition, different wires are often used to transmit control information such as bus request and grant signals or acknowledgment signals.

Figure 1A:
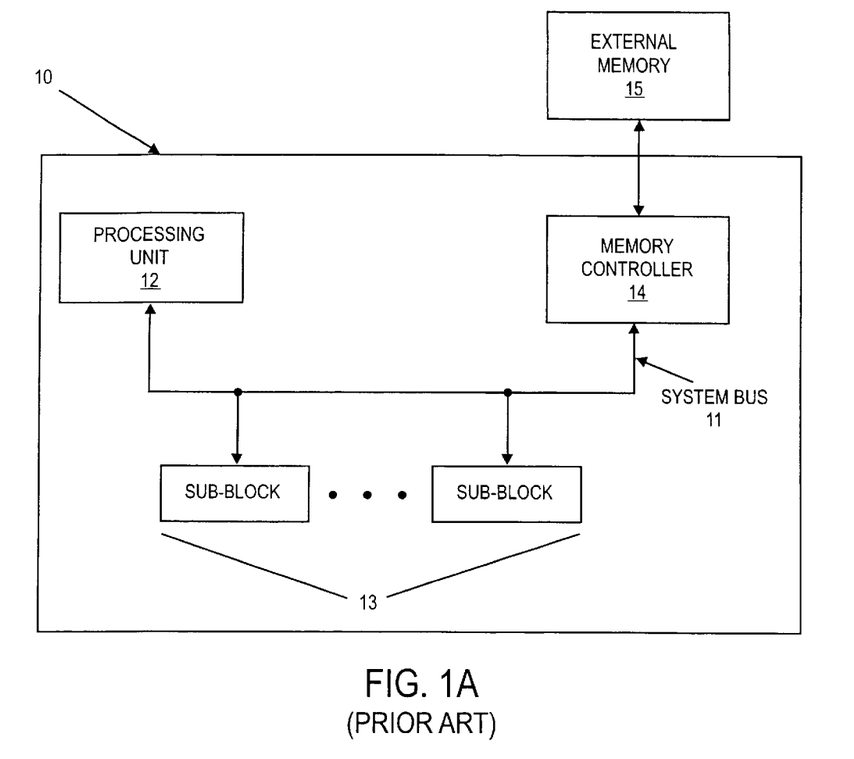
FIG. 1A shows an example of a prior art system bus interconnection in a processing system.

One of the sub-blocks that a system bus is connected to is the memory controller of the processing system which arbitrates and coordinates memory transactions on the system bus between the other systems sub-blocks as well as to an external memory. FIG. 1A shows a typical design of a system bus 11 in a processing system 10 having a processing unit 12, a plurality of sub-blocks 13, a memory controller 14, and an external memory 15 (e.g., a disc drive or external memory device). As shown, the system bus includes a set of address lines, data lines, and control lines including request and grant lines.

Figure 1B:
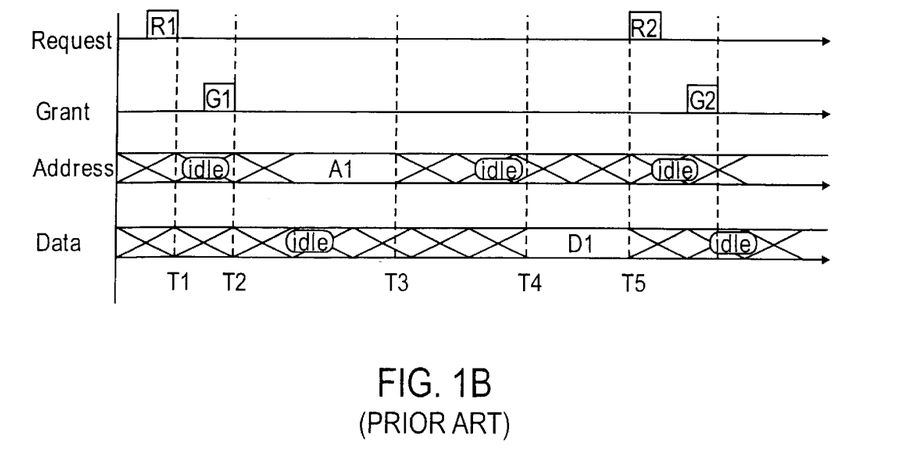
FIG. 1B shows a timing diagram for performing a memory transaction in the prior art processing system shown in FIG. 1A.

FIG. 1B shows a timing diagram illustrating a conventional data transfer between a sub-block 13 coupled to the system bus 11 and the external memory 15. Initially, the sub-block transmits a request signal R1 at time T1 to the memory controller on a request signal line. The memory controller includes a means of arbitrating between requests on the system bus from the sub-blocks to determine which is to have control of the system bus to perform its memory transaction. Once, the memory controller arbitrator determines which sub-block's request is to be serviced next, it returns a grant signal G1 at time T2 to the sub-block. Upon the receipt of the grant signal, the sub-block begins transmitting an address A1 at time T3 to the memory controller for performing the read or write operation with the external memory. During this time the sub-block has control of the system bus and the remainder of the sub-blocks cannot transmit address or data information on it. Hence, only address A1 is being transmitted on the address bus. The memory controller accesses the external memory with the address and at time T4 begins transmitting data D1 to the sub-block. Once the data is transmitted at time T5, the next request signal R2 can be sent to the memory controller.

As can be seen in this timing diagram, due to latencies inherent to the system bus and the overall processing system architecture, both the address and data signal lines remain idle for many cycles while each memory request is being serviced. In particular, there is an associated latency that occurs from the time that the address A1 is transmitted to the memory controller until the time that the data D1 begins transmission which is caused by the inherent hardware (e.g., signal buffers, capacitive signal lines, drivers, flip-flops etc.) related delays of transmitting the signal through the sub-block, on the address signal line, through the memory controller, and then to the address pins of the external memory. In addition, there is a latency associated with arbitrating each memory transaction request which consists of several cycles for transmitting a request signal, for arbitrating the requests, and for transmitting the grant signal.

Moreover, traditionally, the system bus is used exclusively to perform memory transactions. Any other data transactions, such as a register transaction in which a register in one sub-block is read by or written to by, for instance, another sub-block or the system CPU, is performed using a completely separate bus system having its own arbitration and protocol scheme. As can be imagined, having a completely separate bus system for performing register transactions requires additional wiring and other circuitry to support the separate bus system resulting in an increased system size.

The present invention is a method of performing memory and register transactions on the system bus which 1) reduces the above described memory latencies, 2) minimizes the number of idle cycles of the address and data signal lines thereby increasing system bus efficiency, 3) can be used to perform register transactions thereby minimizing address and data signal line idle cycles, and 4) eliminates the need for a separate register transaction bus.

SUMMARY OF THE INVENTION

The present invention is a method of efficiently performing transactions on the system bus which includes at least a request signal line, a grant signal line, a set of address signal lines, and a set of data signal lines.

In a first embodiment of the method for efficiently performing transactions on the system bus, a first memory transaction request is issued from a system sub-block to a memory controller on the request signal line and then granted by the memory controller. Upon the falling edge of the grant signal from the memory controller a second memory transaction can be issued after the grant of the first memory transaction—prior to the completion of the servicing of the first memory transaction. A first address corresponding to the first memory transaction request is then transmitted on the address signal lines of the system bus to the memory controller wherein the memory controller begins servicing the first memory transaction request. Once the first address is transmitted to the memory controller, the address lines are available for transmitting a second address corresponding to the second memory transaction request to the memory controller. The memory controller then stores the second address in a buffer whereupon the completion of servicing the first memory transaction request, the second request can be serviced without waiting for the address to be transmitted to the memory controller.

According to the first embodiment, more than one memory transaction request address can be buffered within the memory controller. Hence in this embodiment after the first memory transaction request is granted, arbitration occurs between any subsequent requests and a next request is granted depending on an arbitration technique. Once a next request is granted a corresponding address is transmitted to the memory controller and queued within the memory controller so that address and data are constantly being pumped through the address and data lines of the system bus with minimized idle cycles.

In a second embodiment of the method for efficiently performing transactions on the system bus, register transactions between system sub-blocks and the system's central processing unit are performed using the system bus by multiplexing register address and data signals onto the address signal lines of the system bus when the address signal lines are idle, thereby further minimizing address line idle cycles.

BRIEF DESCRIPTION OF THE DRAWINGS

The present invention may be further understood from the following written description in conjunction with the appended drawings. In the drawings.

DETAILED DESCRIPTION OF THE PREFERRED EMBODIMENTS

In general, the method of efficiently performing transactions on the system bus in accordance with the present invention involves utilizing cycles within the address and data bus that would normally be idle when performing prior art system bus transaction methods.

System Bus Memory Transactions

In a first embodiment of the method of performing transactions on a system bus 11 between a plurality of system sub-blocks 13 and an external memory 15 (FIG. 1A), once a memory transaction is issued by one of the system sub-blocks 13 and is granted by the memory controller 14, a subsequent memory transaction can be issued by one of the plurality of system sub-blocks and granted while the first request is being serviced. Once the subsequent request is granted, an address corresponding to the subsequent memory transaction request is transmitted on the system bus to the memory controller where it is stored in an address buffer. Multiple memory transaction addresses can be queued within a memory controller address buffer and can then be serviced in the order as stored.

Figure 2A:
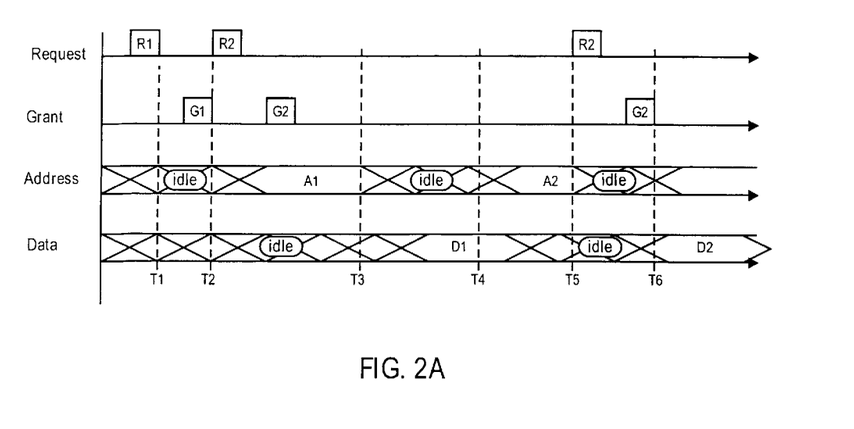
FIG. 2A shows a first timing diagram illustrating a first embodiment of a method of efficiently performing transactions on a system bus in which subsequent memory transaction requests are issued and granted prior to the servicing of a previous ongoing memory transaction request.

FIG. 2A shows a first timing diagram illustrating the first embodiment of the method of performing transactions on system bus 11. Initially a first request R1 for a first memory transaction is submitted on the request signal line to the memory controller 14. If more than one request in received at the same time, the memory controller arbitrates between the requests and sends a grant signal G1 to the sub-block which has the highest priority according to the bus arbitration scheme used in the system. Once the sub-block receives the grant signal it begins to transmit a first address A1 corresponding to the first memory transaction address on the address signal lines as well as whether a read or write transaction is to be performed. In response to receiving the first address, the memory controller begins servicing the first memory transaction and data D1 is transmitted on the data signals lines.

In accordance with the first embodiment of the method of the present invention of efficiently performing transactions on the system bus as shown in FIG. 2A, at least one subsequent second request R2 can be issued immediately after the grant signal G1 of the first request. If more than one subsequent request is issued, the memory controller arbitrates between the requests and then issues a second grant signal G2 to the system sub-block having the highest arbitration priority. Once the second grant signal is received by the second requesting system sub-block it begins to transmit a corresponding second address A2. Note that A2 is transmitted prior to the completion of the servicing of the first transaction and after the transmission of the first address A1. The second address A2 is then stored within the memory controller until the first memory transaction request is serviced whereupon the second address A2 is retrieved and servicing of the second memory transaction request begins.

It should be noted that the method as shown in FIG. 2A reduces memory transaction latency since the cycles required to perform 1) transmitting the memory transaction request, 2) arbitrating the request, 3) transmitting the grant signal, and then 4) transmitting the memory transaction address become transparent since they occur while the prior memory transaction is being serviced (assuming consecutive memory transaction requests). Hence, once the first memory transaction is complete, servicing of the next request begins by accessing the address A2 from the buffer in the memory controller. Moreover, since the address is already stored within the memory controller, the latency time to transmit the address A2 to the memory controller from a given sub-block is also obviated. Hence, servicing of the consecutive request can begin immediately thereby effectively overlapping memory requests on the system bus.

The steps of the first embodiment of the present invention of efficiently performing transactions on the system bus as illustrated in the timing diagram shown in FIG. 2A include is as follows. Initially, at least one memory transaction request is issued from one of a plurality of system sub-blocks 13 to a memory controller 14. Next, if more than one request is received, the memory controller arbitrates between the requests and depending on the arbitration scheme, the memory controller grants a first memory transaction request R1 by sending a grant signal G1 to the sub-block where the first memory request originated and initiates the servicing of the first memory transaction request. Next, and any time after the sending of the first grant signal (i.e., concurrent with the servicing of the first memory transaction request) at least one memory transaction request is subsequently transmitted from one of the plurality of system sub-blocks 13 to the memory controller and a second arbitration is performed which is followed by the granting of a second memory transaction request. Once the second memory transaction is granted, an address corresponding to the second memory transaction is transmitted to the memory controller and stored within a memory controller buffer queue. Upon the completion of servicing the first memory transaction, servicing of the second memory transaction begins by accessing the second buffered address from the memory controller. In a variation of the first embodiment, more than one memory transaction request is stored and queued within the memory controller buffer and the requests are serviced in the order in which they are queued.

Figure 2B:
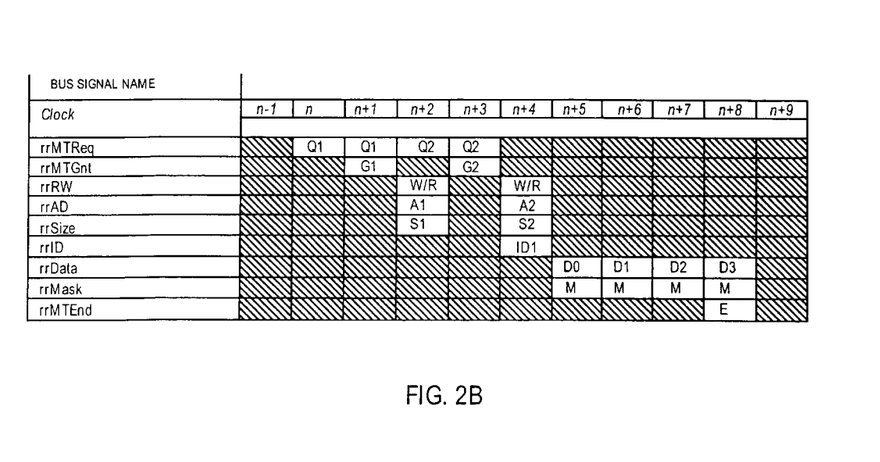
FIG. 2B shows a second timing diagram illustrating the first embodiment of a method of efficiently performing transactions on a system bus.

FIGS. 2B shows a second timing diagram illustrating memory transactions on a system bus in accordance with the first embodiment of the method of the present invention in which the system bus includes a memory transaction request line MTReq, a memory transaction grant line MTGnt, a read or write indicator signal line RW, an address signal line AD, a size signal line, a sub-block or client signal line ID, a data signal line Data, and an end memory transaction signal line MTEnd.

As shown in FIG. 2B, a first request signal Q1 is asserted on the MTReq signal line which is granted with the G1 signal transmitted on the MTGnt signal line. In the next cycle three signals are asserted including 1) a W or R signal ("W/R" in FIG. 2B) asserted on the RW signal line indicating whether the memory transaction is a read or write, 2) an address signal A1 asserted on the AD signal line, 3) and a size signal S1 asserted on the Size signal line. Also shown is a second request signal Q2 asserted in the cycle after the G1 signal which is followed by the second grant signal G2 in accordance with the first method of the present invention.

Data transfers on the Data bus are scheduled by a memory controller scheduler within the memory controller. In one embodiment, a round-robin arbitration scheme is used. In a preferred embodiment, the data transfers are limited in time. At the start of a data transfer, the memory controller specifies the sub-block ill on the ill bus. The first word of data is driven on the Data bus at the same cycle in the case of a read operation or the next cycle in the case of a write operation. The memory controller scheduler asserts the MTEnd signal ("E" of FIG. 2B) during the last data transfer transaction (e.g., "D3" of "D0", "D1", "D2" "D3" of FIG. 2B) dependent on the size (S1) signal provided at the beginning of the transaction along with the address and the read/write indicator RW signal such that the sub-block doesn't have to keep track of how many words it has read or written. A second memory transaction is partially observed in FIG. 2B. The second memory transaction is granted ("G2") at n+3 and indicates at n+4: 1) the transaction is a read or write ("W/R"); 2) the corresponding address ("A2"); and, 3) the size ("S2").

Only one ID is broadcast to sub-blocks to generate an address. Addresses are queued in the controller. The mask (M) controls the sizing of bytes to form longer valid data transfer sets.

System Bus Register Transactions

In accordance with a second embodiment of the present invention of efficiently performing transactions on the system bus the address lines of the system bus are used to transmit register request data and address signals. In particular, in prior art system bus architectures, register transactions and transmission of register data and address signals are performed on a separate register transaction bus. In contrast, according the a second method of utilizing the system bus, register data and address signals are transmitted over the address lines of the system bus by multiplexing the register transaction data and address signals over the address lines.

Figure 3A:
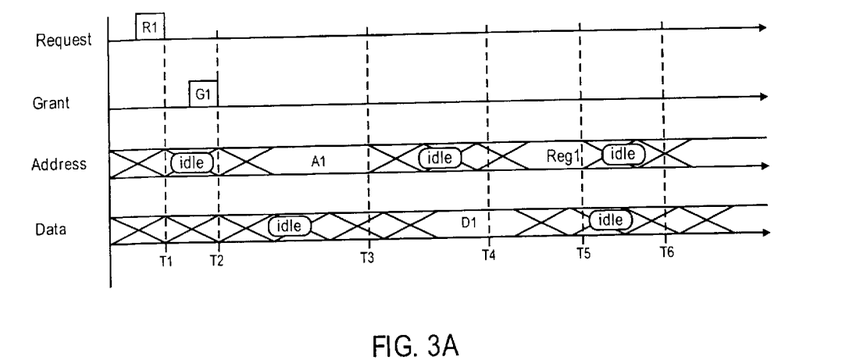
FIG. 3A shows a first timing diagram illustrating a second embodiment of a method performing register transactions on a system bus in which the memory transaction address lines of the system bus are used for transmitting register transaction data.

FIG. 3A shows a first timing diagram of a memory transaction being transmitted over the system bus which includes a request signal line REQUEST, a grant signal line GRANT, an address signal line ADDRESS, and a data signal line DATA. As shown, the request and grant signals, R1 and G1, for a memory transaction are transmitted on the REQUEST and GRANT signals lines. The address A1 corresponding to the request is then transmitted on the ADDRESS signal line. In accordance with prior art methods, during the time period in which no addresses are being transmitted on the address signal lines ADDRESS, the address signal lines AD are idle, representing an inefficient use of the system bus. However in accordance with a second method of signal transmission on the system bus, register transactions are transmitted on the address bus lines during the idle cycles between address transmission. As can be seen in FIG. 3A, a register transaction address and data signals (generally indicated as REG1 in FIG. 3A), are transmitted on the address bus after the address A1 has been transmitted.

The bus interface opportunistically allows register-to-register transactions when there are no active memory-to-register/register-to-memory transactions.

Figure 3B:
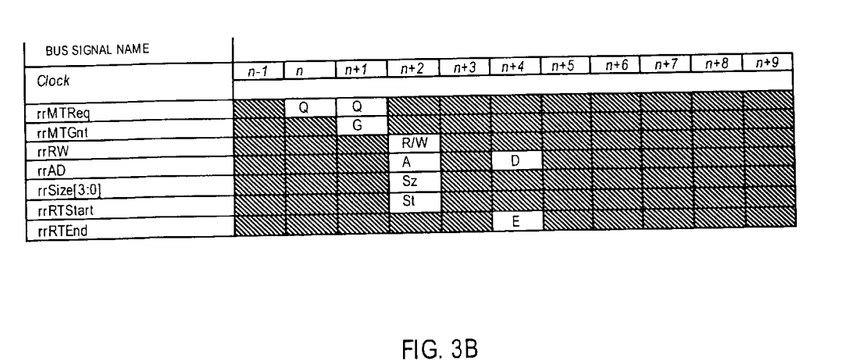
FIG. 3B shows a second timing diagram illustrating a second embodiment of a method performing register transactions on a system bus.

FIG. 3B shows a second timing diagram illustrating a register transaction and a memory transaction being performed on a system bus in accordance with the second embodiment of the present invention in which the system bus includes a register transaction request line RTReq, a register transaction grant line rrRTGnt, a read or write indicator signal line RW, an address signal line AD, a register transaction size signal line RTSize, a start register transaction signal line RTStart, and an end register transaction signal line RTEnd. Memory transactions occur, ideally, in bursts with multibytes of data such as in a standard DMA transfer. Register tranfers are point-to-point and are typically short transfers and can operate in one clock transition cycle.

Register transactions can be initiated by a system sub-block 13 or the processing unit 12 (FIG. 1A). The module or system element that initiates the register transaction is called the master element and the element that responds to the register transaction is referred to as the slave or target element. As shown in FIG. 3B a request signal Q is asserted by the master element on the RTReq signal line to request a register transaction. The request signal Q is held until a grant signal G is returned by the system bus arbitrator on the RTGnt signal line. The processor is preferably a scalar execution unit with a regular sequence at register access which we process in a serial fashion. Register opportunistically uses available bandwidth between memory transfers. Once the register transaction request has been granted, four signals are transmitted by the master element including 1) a R or W signal on the RW signal line indicating a read or write register transaction, 2) an address signal A on the AD signal line providing the address of the register location in a given slave element 3) a S signal on the RTSize signal line, and 4) a St signal on the RTStart signal line. Each slave element has a corresponding address space and the slave element in which the address on the AD signal line falls within their address space responds to the register request. The data D is transmitted on the AD signal line after the address signal A is transmitted. The data signal is sent immediately after the Address/Read/Write and Size signals on the next available cycle.

In some instances, the target element may not be ready to complete the register transaction within the typical number of cycles due to an internal arbitration issue or if the target element is busy with a memory transaction. Data is provided on a bus as long as it doesn't receive the RTE signal. Once target sinks/sources data, the RTEnd is sent to complete the transaction.

In one embodiment, in the case of a read transaction, the target element asserts the E signal on the RTEnd signal line indicating the end of the read transaction during the cycle that the read data is returned on the AD signal lines. In the case of a write transaction, the target element asserts the E signal on the RTEnd signal lines indicating the end of the write transaction during the cycle when it can take the data.

Bus Architecture

Figure 3C:
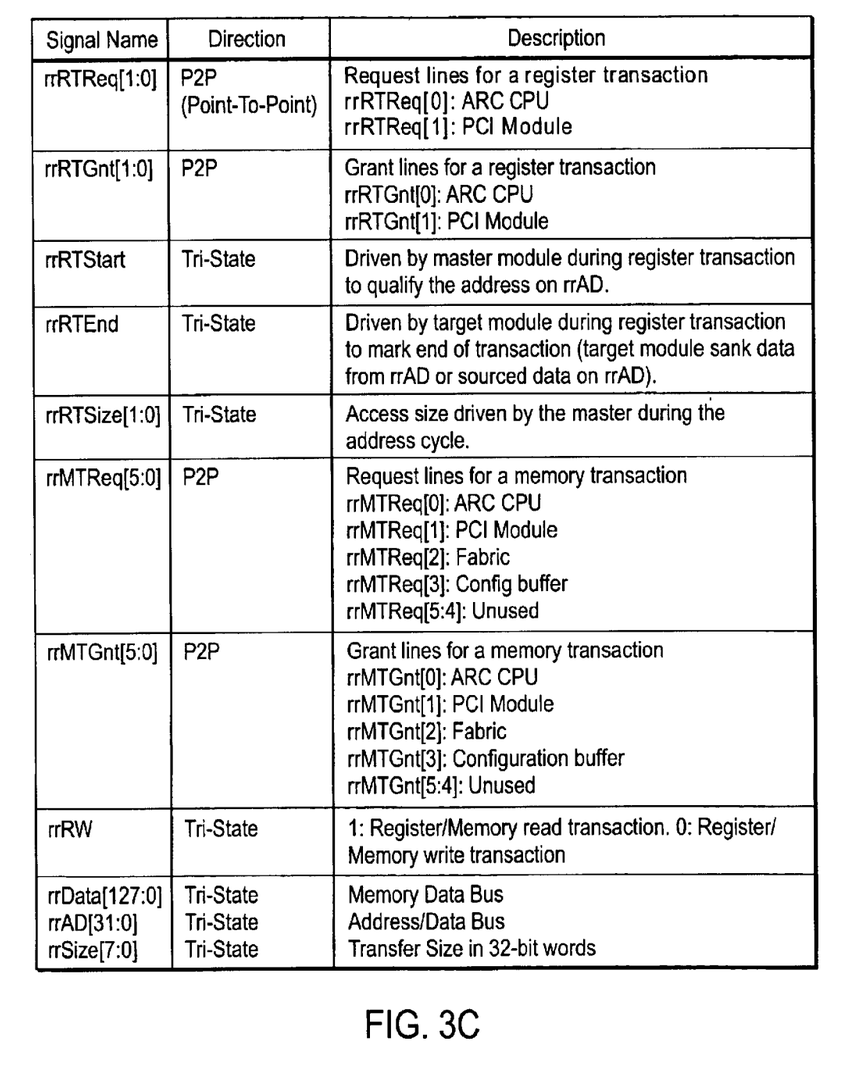
FIG. 3C shows signal lines of one embodiment of a system bus for performing the first and second embodiments of the method of efficiently performing transactions on a system bus.
Figure 3D:
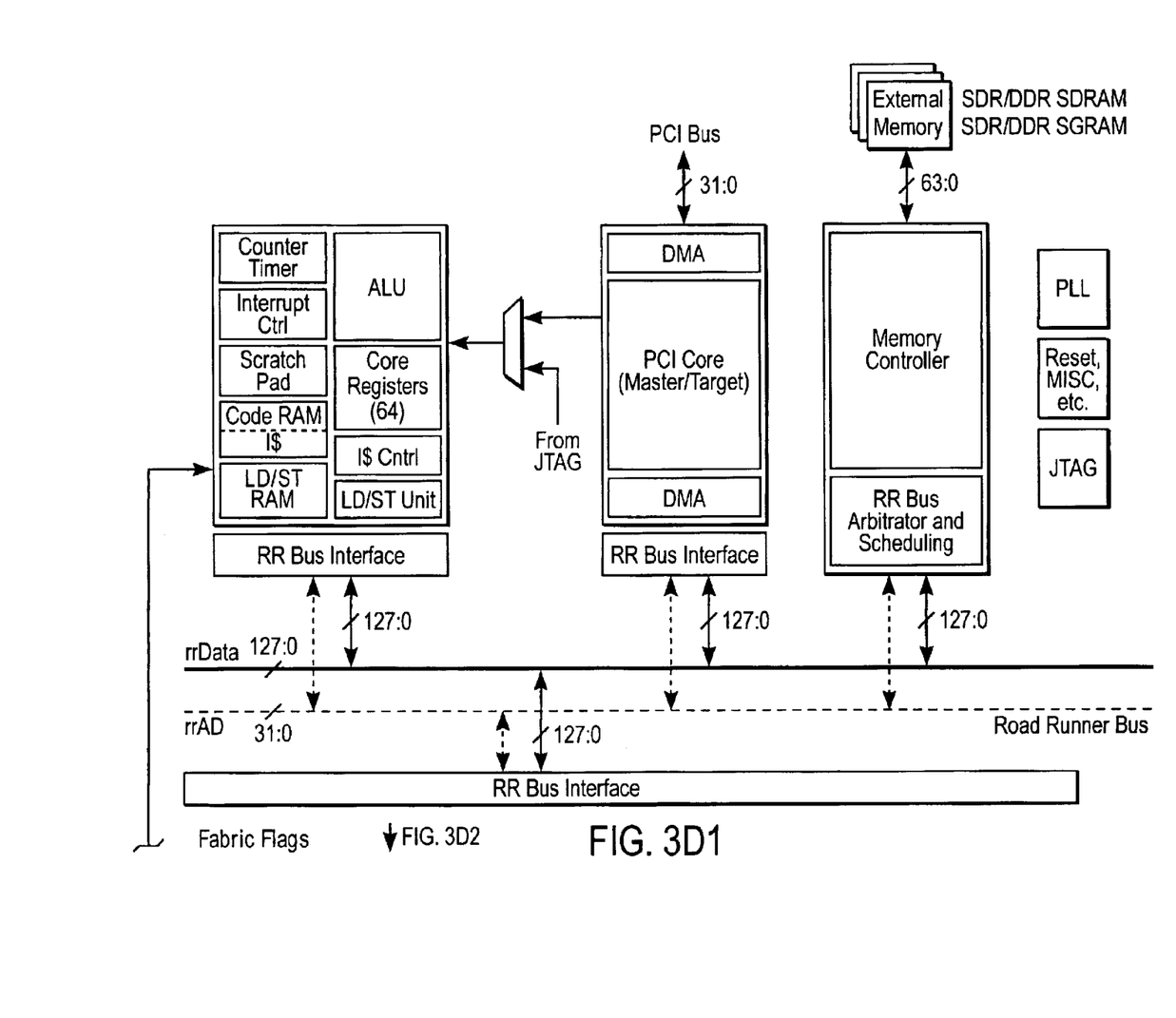
FIG. 3D shows a system utilizing a system bus having signal lines as shown in FIG. 3C.
Figure 3D:
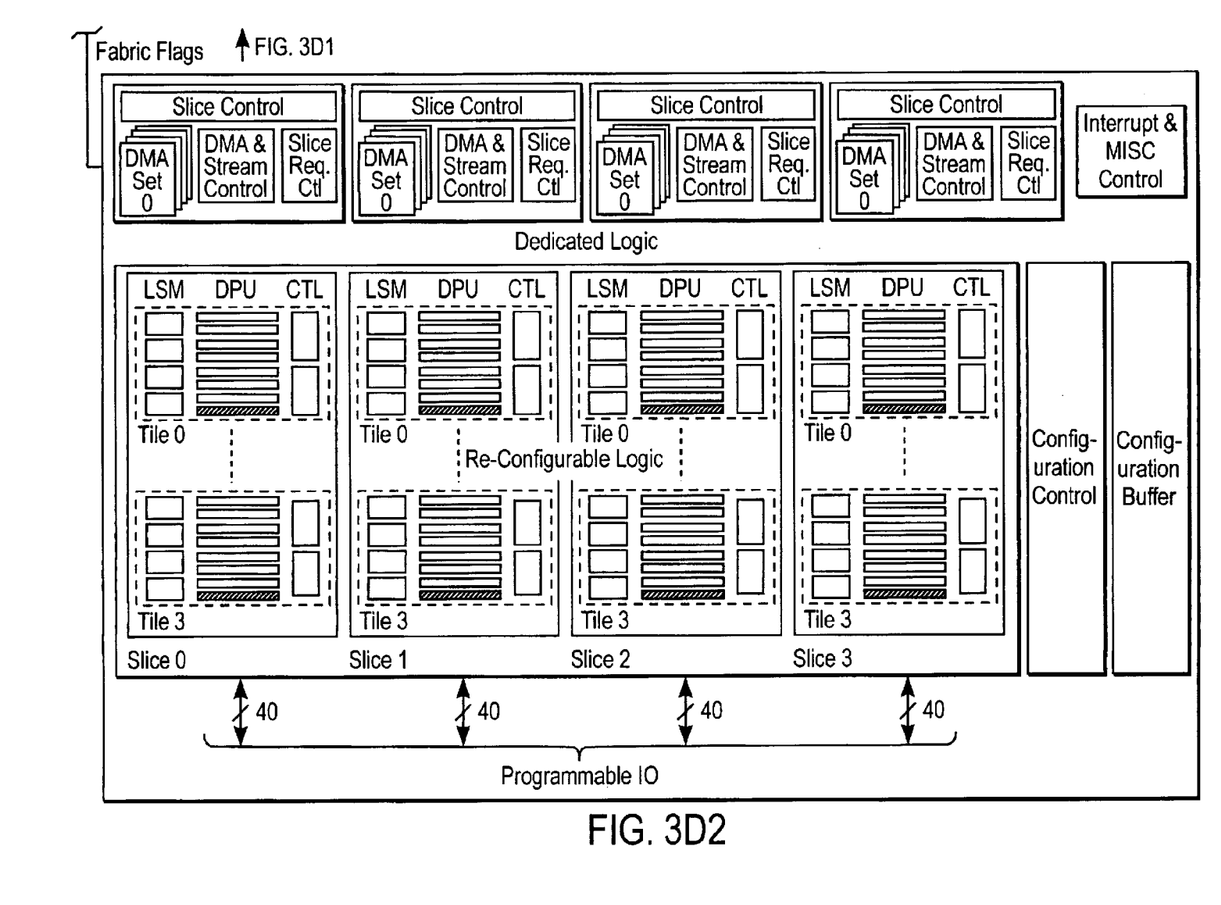

FIG. 3C shows signal lines of one embodiment of a system bus for performing the first and second embodiments of the method of efficiently performing transactions on a system bus and FIG. 3D shows a system utilizing a system bus having signal lines as shown in FIG. 3C. As shown, the system bus includes separate transaction request signal lines for each of a register transaction and a memory transaction (rrRTReq[1:0] and rrMTReq[5:0]), separate transaction grant signal line for each of a register transaction and a memory transaction (rrRTGnt[1:0] and rrMTGnt[5:0]), separate size signal lines for each of a register transaction and a memory transaction (rrRTSize[1:0] and rrSize[7:0]), the same set of signal lines to transfer both memory transaction address signals and register transaction data and address signal lines (rrAD[31:0]), a set of signal lines for transferring memory transaction data (rrData[127:0]), a same set of signal lines for indicating a read or write transaction for both a memory and a register transaction (rrRW[127:0]), a set of signal lines for indicating the start of a register transaction (rrRTStart), and a set of signal lines for indicating the end of a register transaction (rrRTEnd).

When performing a memory transaction on the system bus as shown in FIG. 3C data signals are transmitted on the rrData signal lines and address signals are transmitted on the rrAD signals lines. Alternatively, when performing a memory transaction both the address and the data signals are transmitted on the rrAD signal lines. Moreover, a single arbitrator and scheduler coordinates the signals on the system bus. Hence, instead of having a separate bus for each of the memory and register transactions, a single system bus is designed to accommodate both memory and register transactions.

In the preceding description, numerous specific details are set forth, such as specific functional elements or processing system structures in order to provide a thorough understanding of the present invention. It will be apparent, however, to one skilled in the art that these specific details need not be employed to practice the present invention. In other instances, well known processing system operation and theory have not been described in order to avoid unnecessarily obscuring the present invention.

Moreover, although the components of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recite only those features regarded as essential to the invention.

What I claim is:

1. A method of performing memory transactions in a processing system including a plurality of system sub-blocks, a memory controller, a main memory, and a system bus including a first set of signal lines for transmitting memory transaction request and grant signals, a second set of signal lines for transmitting memory transaction address signals, and a third set of signal lines for transmitting memory transaction data signals, said method comprising the steps of:

1) a first sub-block transmitting a first memory transaction request signal on said first set of signal lines to said memory controller for performing a first memory transaction with said main memory;

2) said memory controller issuing a first grant signal on said first set of signal lines to said first sub-block in response to said first memory transaction request signal;

3) said first sub-block transmitting a first address corresponding to said first memory transaction;

4) said memory controller servicing said first memory transaction request upon receipt of said first address;

wherein after said issuing of said first grant signal (step 2) and prior to completion of said servicing of said first memory transaction (step 4):

a) said memory controller issuing a second grant signal, based upon an arbitration scheme in response to a second memory transaction request signal originating from one of said plurality of system sub-blocks; and b) said one system sub-block transmitting a second address corresponding to said second memory transaction to said memory controller;

c) storing said second address in said memory controller;

d) said memory controller accessing said second address on completion of said servicing of said first memory transaction request; and e) servicing said second memory transaction request.

2. The method as described in claim 1 further comprising a step of repeating steps 4a)–4f) for a plurality of subsequent memory transaction requests and storing a plurality of addresses in said memory controller corresponding to said plurality of subsequent memory transaction requests.

3. The method as described in claim 2 comprising the step of storing said plurality of addresses in an ordered queue and said memory controller servicing said plurality of subsequent memory transaction requests according to said plurality of addresses ordered queue.

4. A method of utilizing a system bus in a processing system including a plurality of system sub-blocks, a memory controller, a main memory, and a system bus including a first set of signal lines for transmitting memory transaction request and grant signals, a second set of signal lines for transmitting memory transaction address signals, and a third set of signal lines for transmitting memory transaction data signals, said method comprising the steps of:

transmitting address signals associated with memory transactions on said second set of signal lines and transmitting data signals associated with said memory transactions on said third set of lines; and transmitting address signals and data signals associated with register transactions on said second set of signal lines and not on said third set of signal lines.

5. The method as described in claim 4 wherein said register transaction address signals and data signals and said memory transaction address signals are alternately multiplexed onto said second set of signal lines.

6. A system bus for communicating register transactions and memory transactions comprising:
   separate transaction request signal lines for each of said register transactions and said memory transactions;
   separate transaction grant signal lines for each of said register transaction and said memory transaction;
   a same set of signal lines to transfer both memory transaction address signals and register transaction data and address signal lines;
   a set of signal lines for transferring memory transaction data;
   a same set of signal lines for indicating a read or write operation for both said memory and said register transactions.

7. The system bus as described in claim 6 further comprising separate transaction size signal lines for each of said register transaction and said memory transaction.

8. The system bus as described in claim 6 further comprising a set of signal lines for indicating the start of said register transactions and a set of signal lines for indicating the end of said register transactions.

9. A method, comprising:
   upon a bus comprising a first set of lines and a second set of lines:
      performing a memory transaction by:
         transferring an address for a memory read or write over said first set of lines;
         transferring data associated with said memory read or write over said second set of lines;
      performing a register transaction by:
         transferring an address for a register location over said first set of lines and not over said second set of lines;
         transferring data read from or to be written to said register location over said first set of lines and not over said second set of lines after said transferring an address for said register location.

10. The method of claim 9 wherein said performing a memory transaction further comprises:
   prior to transferring an address for said memory read or write and
   prior to said transferring data associated with said memory read or write:
      requesting said memory transaction;
      granting said memory transaction.

11. The method of claim 10 wherein said performing a memory transaction further comprises basing said granting upon an arbitration scheme.

12. The method of claim 11 wherein said arbitration scheme further comprises a round-robin arbitration scheme.

13. The method of claim 10 further comprising:
   after said granting and
   prior to said transferring data associated with said memory read or write over said second set of lines:
      requesting a second memory transaction;
      granting said second memory transaction.

14. The method of claim 10 wherein said performing a memory transaction further comprises:
   after said granting and
   prior to said transferring data associated with said memory read or write:
      identifying said memory transaction as a memory read or a memory write.

15. The method of claim 14 wherein said identifying occurs over a time period in which said transferring an address for a memory read or write over said first set of lines occurs.

16. The method of claim 10 wherein said performing a memory transaction further comprises:
   after said granting and
   prior to said transferring data associated with said memory read or write:
      indicating a size of the amount of data said memory transaction is to transfer.

17. The method of claim 16 wherein said indicating occurs commensurate with identifying said memory transaction as a memory read or a memory write.

18. The method of claim 9 wherein said transferring data associated with said memory read or write over said second set of lines occurs in bursts.

19. The method of claim 9 wherein said performing a register transaction further comprises:
   prior to said transferring an address for a register location:
      requesting said register transaction;
      granting said register transaction.

20. The method of claim 19 wherein said performing a register transaction further comprises:
   after said granting and
   prior to said transferring data read from or to be written to said register location:
      indicating a size of the amount of data said register transaction is to transfer.

21. A method, comprising:
   upon a bus interface comprising a first set of lines and a second set of lines, said bus interface part of a sub-block or processing unit:
      performing a memory transaction by:
         sending an address for a memory read or write over said first set of lines;
         transferring data associated with said memory read or write over said second set of lines;
      performing a register transaction by:
         transferring an address for a register location over said first set of lines and not over said second set of lines;
         transferring data read from or to be written to said register location over said first set of lines and not over said second set of lines after said transferring an address for said register location.

22. The method of claim 21 wherein said performing a memory transaction further comprises:
   prior to said sending an address for said memory read or write and
   prior to said transferring data associated with said memory read or write:
      sending a request for said memory transaction;
      receiving a grant for said memory transaction.

23. The method of claim 22 further comprising:
   after said receiving a grant and
   prior to said transferring data associated with said memory read or write over said second set of lines:
      sending a second request for a second memory transaction;
      receiving a second grant for said second memory transaction.

24. The method of claim 22 wherein said performing a memory transaction further comprises:
after said receiving a grant and
prior to said transferring data associated with said memory read or write:
sending an identification of said memory transaction as a memory read or a memory write.

25. The method of claim 24 wherein said sending an identification occurs over a time period in which said sending an address for a memory read or write over said first set of lines occurs.

26. The method of claim 22 wherein said performing a memory transaction further comprises:
after said receiving a grant and
prior to said transferring data associated with said memory read or write:
indicating a size of the amount of data said memory transaction is to transfer.

27. The method of claim 26 wherein said indicating occurs commensurate with identifying said memory transaction as a memory read or a memory write.

28. The method of claim 21 wherein said transferring data associated with said memory read or write over said second set of lines occurs in bursts.

29. The method of claim 21 wherein said performing a register transaction further comprises:
prior to said transferring an address for a register location:
sending a request for said register transaction;
receiving a grant for said register transaction.

30. The method of claim 29 wherein said performing a register transaction further comprises:
after said receiving a grant and
prior to said transferring data read from or to be written to said register location:
sending an indication of a size of the amount of data said register transaction is to transfer.

31. The method of claim 21 wherein said transferring data associated with said memory read or write further comprises:
sending said data if said memory transaction is a memory write;
receiving said data if said memory transaction is a memory read.

32. The method of claim 21 wherein said transferring data read from or to be written to said register location further comprises:
sending said data to be written to said register location; or,
receiving said data read from said register location.

33. The method of claim 21 wherein said transferring data read from or to be written to said register location further comprises:
receiving said data to be written to said register location; or,
sending said data read from said register location.

34. A method, comprising:
upon a bus interface comprising a first set of lines and a second set of lines, said bus interface part of a memory controller:
performing a memory transaction by:
receiving an address for a memory read or write over said first set of lines;
transferring data associated with said memory read or write over said second set of lines;
performing a register transaction by:
transferring an address for a register location over said first set of lines and not over said second set of lines;
transferring data read from or to be written to said register location over said first set of lines and not over said second set of lines after said transferring an address for said register location.

35. The method of claim 34 wherein said performing a memory transaction further comprises:
prior to said receiving an address for said memory read or write and
prior to said transferring data associated with said memory read or write:
receiving a request for said memory transaction;
sending a grant for said memory transaction.

36. The method of claim 35 wherein said performing a memory transaction further comprises basing said grant upon an arbitration scheme executed by said memory controller.

37. The method of claim 36 wherein said arbitration scheme further comprises a round-robin arbitration scheme.

38. The method of claim 35 further comprising:
after said sending a grant and
prior to said transferring data associated with said memory read or write over said second set of lines:
receiving a request for a second memory transaction;
sending a grant for said second memory transaction.

39. The method of claim 35 wherein said performing a memory transaction further comprises:
after said sending a grant and
prior to said transferring data associated with said memory read or write:
receiving an identification of said memory transaction as a memory read or a memory write.

40. The method of claim 39 wherein said receiving an identification over a time period in which said receiving an address for a memory read or write over said first set of lines occurs.

41. The method of claim 35 wherein said performing a memory transaction further comprises:
after said sending a grant and
prior to said transferring data associated with said memory read or write:
receiving an indication of the amount of data said memory transaction is to transfer.

42. The method of claim 41 wherein said receiving an indication occurs commensurate with receiving an identification of said memory transaction as a memory read or a memory write.

43. The method of claim 34 wherein said transferring data associated with said memory read or write over said second set of lines occurs in bursts.

44. The method of claim 34 wherein said performing a register transaction further comprises:
prior to said transferring an address for a register location:
requesting said register transaction.

45. The method of claim 34 wherein said transferring data associated with said memory read or write further comprises:
receiving said data if said memory transaction is a memory write;
sending said data if said memory transaction is a memory read.

46. The method of claim 34 wherein said transferring data read from or to be written to said register location further comprises:
  receiving said data to be written to said register location; or,
  sending said data read from said register location.

47. A method, comprising:
  transferring an address associated with a memory transaction over a first set of bus lines;
  transferring data associated with said memory transaction over a second set of bus lines;
  transferring an address associated with a register transaction over said first set of bus lines and not over said second set of bus lines; and,
  transferring data associated with said register transaction over said first set of bus lines and not over said second set of bus lines.

48. The method of claim 47 wherein said transferring an address associated with a memory transaction further comprises sending said address associated with a memory transaction.

49. The method of claim 48 further comprising sending a request for said memory transaction and receiving a grant for said memory transaction prior to said sending said address.

50. The method of claim 49 wherein said sending of said address, said sending of said request and said receiving of said grant are performed by a processing unit.

51. The method of claim 50 wherein said transferring an address associated with said register transaction and said transferring data associated with said register transaction are performed by said processing unit.

52. The method of claim 51 wherein said transferring an address associated with said register transaction further comprises sending said address associated with said register transaction.

53. The method of claim 52 wherein said transferring data associated with said register transaction further comprises receiving register data if said register transaction is a read or sending register data if said register transaction is a write.

54. The method of claim 53 wherein said sending of said address associated with said register transaction and said receiving or sending of register data are performed by said processing unit.

55. The method of claim 51 wherein said transferring an address associated with said register transaction further comprises receiving said address associated with said register transaction.

56. The method of claim 55 wherein said transferring data associated with said register transaction further comprises sending register data if said register transaction is a read or receiving register data if said register transaction is a write.

57. The method of claim 56 wherein said receiving of said address associated with said register transaction and said sending or receiving of register data are performed by said processing unit.

58. The method of claim 49 wherein said sending of said address, said sending of said request and said receiving of said grant are performed by a sub-block.

59. The method of claim 58 wherein said transferring an address associated with said register transaction and said transferring data associated with said register transaction are performed by said sub-block.

60. The method of claim 59 wherein said transferring an address associated with said register transaction further comprises sending said address associated with said register transaction.

61. The method of claim 60 wherein said transferring data associated with said register transaction further comprises receiving register data if said register transaction is a read or sending register data if said register transaction is a write.

62. The method of claim 61 wherein said sending of said address associated with said register transaction and said receiving or sending of register data are performed by said sub-block.

63. The method of claim 58 wherein said transferring an address associated with said register transaction further comprises receiving said address associated with said register transaction.

64. The method of claim 63 wherein said transferring data associated with said register transaction further comprises sending register data if said register transaction is a read or receiving register data if said register transaction is a write.

65. The method of claim 64 wherein said receiving of said address associated with said register transaction and said sending or receiving of register data are performed by said sub-block.

66. The method of claim 47 wherein said transferring an address associated with a memory transaction further comprises receiving said address associated with a memory transaction.

67. The method of claim 60 further comprising receiving a request for said memory transaction and sending a grant for said memory transaction prior to said receiving of said address.

68. The method of claim 61 wherein said receiving of said address, said receiving of said request and said sending of said grant are performed by a memory controller.

69. The method of claim 62 wherein said transferring an address associated with said register transaction and said transferring data associated with said register transaction are performed by said memory controller.

70. An apparatus, comprising:
  a) an address/data (AD) bus to transport:
    an address associated with a memory transaction;
    an address associated with a register transaction;
    data associated with said register transaction; and,
  b) a data bus to transport:
    data associated with said memory transaction
    said data bus not to transport:
    said data associated said register transaction.

71. The apparatus of claim 70 further comprising at least one request line to request said memory transaction.

72. The apparatus of claim 70 further comprising at least one grant line to grant said memory transaction.

73. The apparatus of claim 70 further comprising at least one request line to request said register transaction.

74. The apparatus of claim 70 further comprising at least one grant line to grant said register transaction.

75. The apparatus of claim 70 further comprising at least one line to indicate whether said memory transaction is a read or a write.

76. The apparatus of claim 70 further comprising at least one line to indicate whether said register transaction is a read or a write.

77. The apparatus of claim 76 wherein said at least one line is also to indicate whether said memory transaction is a read or a write.

78. The apparatus of claim 70 further comprising at least one size line to indicate the amount of data transferred by said memory transaction.

79. The apparatus of claim 70 further comprising at least one size line to indicate the amount of data transferred by said memory transaction.

80. A processing unit comprising a bus interface, said bus interface comprising:
　a) an address/data (AD) bus to:
　　send an address associated with a memory transaction executed over said bus;
　　transport an address associated with a register transaction executed over said bus;
　　transport data associated with said register transaction; and,
　b) a data bus to:
　　transport data associated with said memory transaction
　　said data bus not to:
　　　transport said data associated said register transaction.

81. The apparatus of claim 70 further comprising at least one request line to send a request for said memory transaction.

82. The apparatus of claim 70 further comprising at least one grant line to receive a grant for said memory transaction.

83. The apparatus of claim 70 further comprising at least one line to send an indication as to whether said memory transaction is a read or a write.

84. The apparatus of claim 70 further comprising at least one size line to indicate the amount of data transferred by said memory transaction.

85. The apparatus of claim 70 further comprising at least one size line to indicate the amount of data transferred by said memory transaction.

86. The apparatus of claim 80 wherein said AD bus is to send said address associated with said register transaction if said processing unit is a master of said register transaction.

87. The apparatus of claim 80 wherein said AD bus is to receive said address associated with said register transaction if said processing unit is a target of said register transaction.

88. The apparatus of claim 80 wherein said AD bus is to send said data associated with said register transaction if:
　said processing unit is a master of said register transaction and said register transaction is a write; or,
　said processing unit is a target of said register transaction and said register transaction is a read.

89. The apparatus of claim 80 wherein said AD bus is to receive said data associated with said register transaction if:
　said processing unit is a target of said register transaction and said register transaction is a write; or,
　said processing unit is a master of said register transaction and said register transaction is a read.

90. An apparatus, comprising:
　a) a bus, said bus comprising:
　　i) an address/data (AD) bus to transport:
　　　an address associated with a memory transaction;
　　　an address associated with a register transaction;
　　　data associated with said register transaction;
　　ii) a data bus to transport:
　　　data associated with said memory transaction
　　　said data bus not to transport:
　　　　said data associated said register transaction;
　b) a memory controller coupled to said bus; and,
　c) a memory coupled to said memory controller.

91. The apparatus of claim 90 further comprising at least one request line to request said memory transaction.

92. The apparatus of claim 90 further comprising at least one grant line to grant said memory transaction.

93. The apparatus of claim 90 further comprising at least one request line to request said register transaction.

94. The apparatus of claim 90 further comprising at least one grant line to grant said register transaction.

95. The apparatus of claim 90 further comprising at least one line to indicate whether said memory transaction is a read or a write.

96. The apparatus of claim 90 further comprising at least one line to indicate whether said register transaction is a read or a write.

97. The apparatus of claim 90 wherein said at least one line is also to indicate whether said memory transaction is a read or a write.

98. The apparatus of claim 90 further comprising at least one size line to indicate the amount of data transferred by said memory transaction.

99. The apparatus of claim 90 further comprising at least one size line to indicate the amount of data transferred by said memory transaction.

100. The apparatus of claim 90 further comprising processing unit coupled to said bus.

101. The apparatus of claim 100 further comprising a sub-block coupled to said bus.

* * * * *